United States Patent [19]
Kulesza et al.

[11] 3,780,659
[45] Dec. 25, 1973

[54] ENVIRONMENTAL FUZE FOR PYROTECHNIC DEVICE

[75] Inventors: Stanley Kulesza, Brooklyn; Max Sapsowitz, Bronx, both of N.Y.

[73] Assignee: The United States of America as represented by the Secretary of the Navy, Washington, D.C.

[22] Filed: Oct. 18, 1972

[21] Appl. No.: 298,731

[52] U.S. Cl. .................... 102/70 B, 102/81, 102/83
[51] Int. Cl. ............................................. F42c 5/02
[58] Field of Search .................. 102/70 R, 70 B, 76, 102/78, 81, 82, 83

[56] References Cited
UNITED STATES PATENTS 3,421,442   1/1969   St. Clair ............................ 102/81 X
3,170,398   2/1965   Paulson et al. ......................... 102/6
3,620,165  11/1971   Henderson ......................... 102/70 B
3,646,889   3/1972   Davis ................................. 102/70 B Primary Examiner—Samuel W. Engle
Attorney—R. S. Sciascia et al.

[57] ABSTRACT

An environmental fuze for use with an air-dropped store having a timed firing mechanism which can be set for different time intervals. Fuze action is initiated by one or more dynamic pressure sensing fins which, upon actuation, initiates a timing mechanism and seals a bellows assembly. The bellows assembly monitors the increase of atmospheric pressure as the store falls and if a predetermined pressure change occurs within a given time period, the firing pin is released to detonate a primer. In the event that the desired pressure change does not occur during a given time interval, the timing mechanism will jam and the fuze will remain in a safe condition.

4 Claims, 8 Drawing Figures

ENVIRONMENTAL FUZE FOR PYROTECHNIC DEVICE

BACKGROUND OF THE INVENTION

The present invention relates to a fuze for a pyrotechnic item, such as an aircraft parachute flare, and more particularly to a fuze which senses the proper environment before any action can start.

An aircraft parachute flare is normally provided with three sections or components, namely a parachute, a section containing a pyrotechnic composition and a triggering mechanism. The triggering mechanism, in addition to igniting the pyrotechnic composition, frequently provides for a delay period so that the aircraft parachute flare can free fall a predetermined distance prior to parachute opening. This free fall feature permits the aircraft parachute flare to be launched or dropped from relatively high altitudes, but prevents ignition of the pyrotechnic composition until the parachute flare is at an altitude such that light from the flare will illuminate the ground below.

As an aircraft parachute flare is an expendable item, possibly the most important features on these flares are the safety features which attempt to prevent accidental or premature ignition of the pyrotechnic composition. As the illuminating materials which are used in present day flares provide extreme heat upon burning, any accidental ignition of these flares could result in a catastrophic disaster, particularly if the flares are in storage aboard a ship. In order to provide some measure of safety, most present day flares are provided with a safety pin which is kept in position until the flare is mounted in a launching rack on an aircraft. In the event the aircraft returns with flares, the safety pins are reinserted.

In one type of fuze widely used by the military departments, a lanyard is provided and has one end attached to the fuze and the other end attached to the aircraft. Upon dropping the store to which the fuze is attached, the lanyard actuates a triggering mechanism which fires the store. While a lanyard is normally successful in triggering a fuze, it has a disadvantage of sometimes causing an undesired triggering, such as the dropping of a store during landing or taxiing of an aircraft. In a carrier landing, for example, an accidental dropping of a flare which is triggered by a lanyard, could cause a serious shipboard fire.

SUMMARY OF THE INVENTION

The present invention relates to an environmental fuze which is adaptable to be attached to an aircraft parachute flare for deploying a parachute and igniting an illuminating composition. Fuze action is initiated by three dynamic pressure sensing fins which, upon opening, cause a bellows assembly to be sealed, and also starts a timing mechanism. The timing mechanism drives a firing pin release device and also a safety barrier mechanism which is also prevented from movement by a bellows plunger until a desired pressure change has taken place. In the event that the desired pressure change does not occur within a given period of time, the entire mechanism will jam, the firing pin will not fire and the safety barrier will not release. It thus requires a given change of pressure to occur within a relative short time period in order to activate the fuze.

It is therefor a general object of the present invention to provide a fuze that will eliminate any type of accidental ignition by sensing a proper environment before any action can start or continue. Fuze action is monitored by an atmospheric pressure sensing bellows which assures that the store to which the fuze is attached is safe during storage, handling, and aborted delivery.

DESCRIPTION OF THE PREFERRED EMBODIMENT

Figure 1:
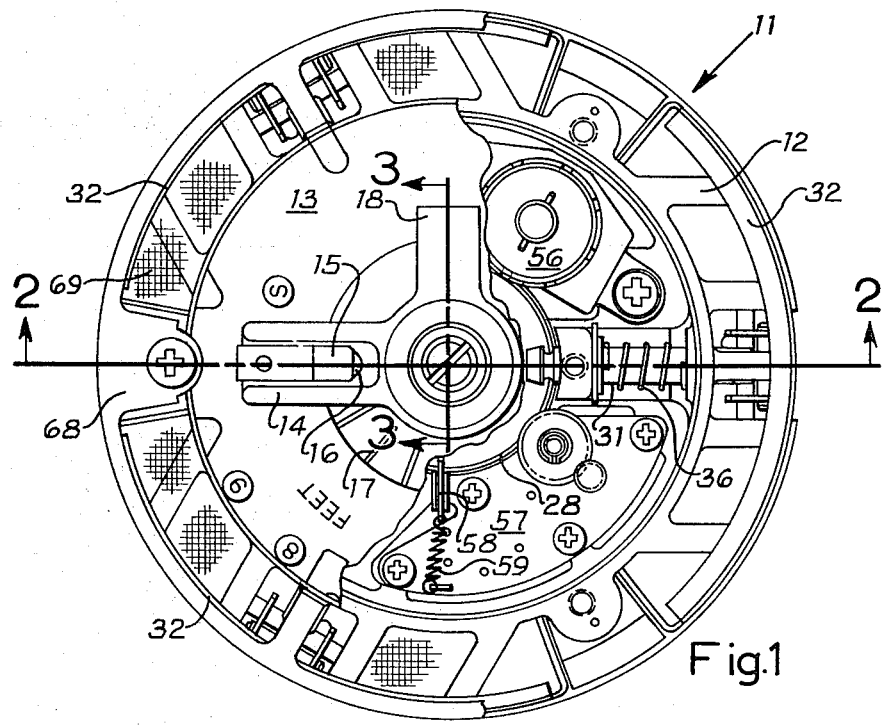
FIG. 1 is a top view, partially broken away, of a preferred embodiment of the invention.

Referring now to the drawings, there is shown an environmental fuze 11 adaptable to be attached to a military store, such as an aircraft parachute flare. By way of example the aircraft parachute flare might be of the type shown and described in U. S. Pat. application Ser. No. 769,999, entitled, "Variable Delay Fuze For Aircraft Parachute Flare," filed Oct. 23, 1968, by Carroll Abel et al.

Figure 2:
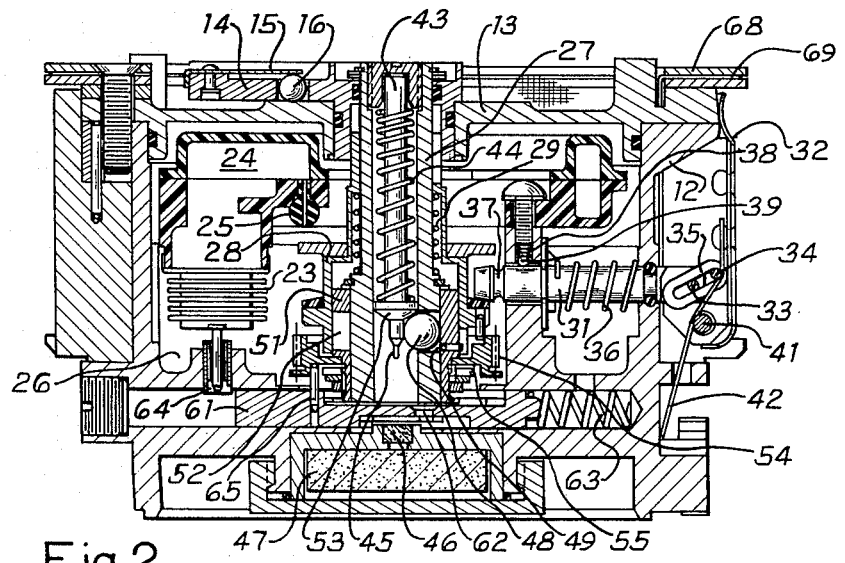
FIG. 2 is a sectional view taken on line 2—2 of FIG. 1.
Figure 3:
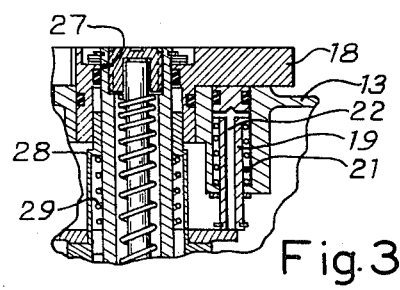
FIG. 3 is a partial sectional view taken on line 3—3 of FIG. 1.

Fuze 11 has a cylindrical housing 12 which is closed by a cover 13. A pointer 14 is rotatably attached to cover 13 and, as will be more fully described later, pointer 14 is used to set the feet of fall required prior to functioning of the fuze. As best shown in FIG. 2 of the drawings a spring 15 and ball 16 are provided in pointer 14 and the spring-biased ball 16 is engageable in slots 17 in cover 13 to provide a detent arrangement. An arm 18 is provided on pointer 14 and, as shown in FIGS. 1 and 3 of the drawings, when pointer 17 is in a safe position, arm 18 retains a spring-biased venting tube 19 within cover 13 to provide a sealed housing 12. When pointer 17, and consequently arm 18, is rotated from its "safe" position to another setting, spring 21 moves venting tube outwardly and air can enter into housing 12 through channels 22 in tube 19. Thus, fuze 11 remains in a sealed condition until a desired altitude setting is made, which setting is normally made prior to an aircraft departing on a mission.

A bellows 23 and reservoir 24 are provided within housing 12, and an aperture in reservoir 24 is provided with la resilient plug 25 that has a bore 26 through which air can pass into reservoir 24 and bellows 23. When plug 25 is open, the pressure within reservoir 24 and bellows 23 is equal to the pressure within the cavity 26 of housing 12. A spindle 27 is provided in housing 12 and an actuator 28 is provided around spindle 27. A biasing spring 29 is provided between an enlarged diameter on spindle 27 and a stepped diameter in actuator 28. When spring 29 is compressed, actuator 28 is maintained in a cocked position by three slidable shafts 31 which are connected to actuator fins 32 through pins 33 and 34 and linkage 35. A spring 36 is provided to bias shaft 31 inwardly into engagement with actuator 28. Each shaft 31 is provided with a groove 37 and a spring 38 and ball 39 are provided in housing 12 so that ball 39 will engage groove 37 and prevent the return of shaft 31 once it is withdrawn from actuator 28. Each fin 32 is pivotally attached to housing 12 by a shaft 41 and a spring 42 is provided for each fin 32 to retain the fin in a normally closed condition. As best shown in FIG. 3 of the drawings, when venting tube 19 is retained in a closed position by arm 18, the inner end of tube 19 engages a flange on actuator 28 and in the event that fins shafts 23 would be withdrawn from engagement with actuator 28, venting tube 19 would prevent any movement of actuator 28.

A firing pin 43 is slidably positioned in the bore of spindle 27 and a spring 44 is provided to drive the tang 45 of firing pin 43 into a primer 46. Ignition of primer 46, in turn, ignites power 47. Firing pin 43 is retained in a cocked position by ball 48 which is positioned in hole 49 in spindle 27. A release plate 51 is rotatably positioned around spindle 27 and a hole 52 is provided in release plate 51 that can be aligned with hole 49 in spindle 27. When holes 49 and 52 become aligned the tapered surface 53 on firing pin 43 and the force provided by spring 44, move ball 48 outwardly into hole 52 and firing pin 43 is triggered. A gear 54 is connected to release plate 51 by a clutch 55 which permits release plate 51 to be rotated when gear 54 is rotated, however, when release plate 51 is rotated by turning pointer 14, clutch 55 permits gear 54 to remain stationary. Gear 54 is capable of being driven by power supply 56 through a timing mechanism 57. By way of example, power supply 56 might have a coil spring that can be manually wound to provide a driving force and timing mechanism 27 might contain a gear train and escapement mechanism to provide a regulated output. A stop arm 58 is provided on timing mechanism 27 and a spring 59 bias stop arm 58 into the escapement mechanism to prevent movement. Stop arm 58 is engageable by actuator 28 and when actuator 28 is released and moved upwardly by spring 29, actuator 28 pivots stop arm 58 and timing mechanism 28 starts operation.

Figure 6:
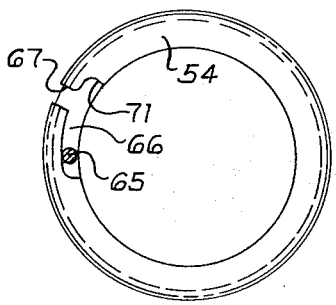
FIG. 6 is a plan view showing a safety barrier pin in a locked or safe condition.
Figure 7:
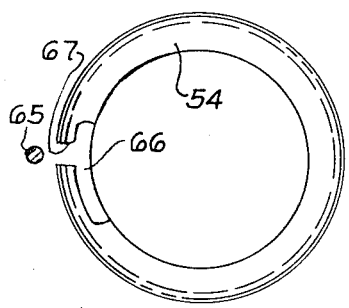
FIG. 7 is a plan view showing a safety barrier pin in an unlocked condition.
Figure 8:
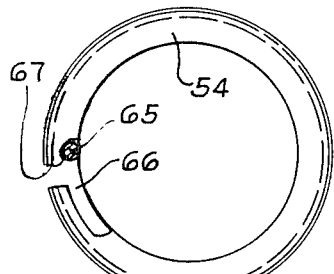
FIG. 8 is a plan view showing a safety barrier pin in a jammed condition.

A safety barrier 61 is slidably mounted in housing 12 and, as best shown in FIG. 2 of the drawings, safety barrier 61 is positioned between the cocked firing pin 43 and primer 46. Safety barrier 61 is provided with an aperture 62 through which the tang 45 of firing pin 43 can pass when firing pin 43 is triggered, and spring 63 is provided to move safety barrier 62 so that aperture 62 will be aligned with tang 45. When fuze 11 is in a "safe" position, two stops prevent movement of safety barrier 62. A plunger 64 is attached to the end of bellows 23 and extends into the path of safety barrier 61. After bellows 23 and reservoir 24 become sealed, an increase in pressure within housing 12 compresses bellows 23 and plunger 24 is withdrawn from the path of travel of safety barrier 61. The second stop preventing movement of safety barrier 61 is a pin 65 that is attached to safety barrier 61. As best shown in FIGS. 6, 7, and 8 of the drawings, pin 65 extends into a relief 66 in gear 54 and a slot 67 in gear 54 permits pin 65 to move free from gear 65. When plunger 64 is withdrawn from the path of safety barrier 61, and pin 65 passes through slot 67, spring 63 moves safety barrier 61 so that aperture 62 is in align with firing pin 43 and, upon triggering of firing pin 43, tang 45 strikes primer 46.

A protective plate 68 is attached to cover 13 and extends slightly beyond fins 32. Plate 68 retains a screen 69 that permits air to open the fins when the fuze is launched. Plate 68 and screen 69 prevent any accidental opening of the fins by preventing any inadvertent engagement of the fins with other objects.

OPERATION

When pointer 14 is in a "safe" position as shown in FIGS. 1, 2, and 3 of the drawings, arm 18 is retaining venting tube 19 in a closed position. Venting tube 19, in turn, prevents actuator 28 from raising and stop arm 58 prevents timing mechanism 57 from operating. The inside pressure of housing 12 is equal to the inside pressure of bellows 23 and reservoir 24, as plug 25 is open and permits the pressure to equalize. Plunger 64 on the end of bellows 23 is extended into the path of travel of safety barrier 61 and prevents its movement by spring 63. Additionally, movement of safety barrier 61 is prevented by pin 65 which is retained by gear 54. In this "safe" condition, if firing pin 43 were somehow released, aperture 62 in safety barrier 61 will not be aligned to receive firing pin 43 and the triggered firing pin will not detonate primer 46. Three shafts 31 also prevent actuator 28 from moving upwardly.

Immediately prior to departing on a mission on which fuze 11 is to be used, pointer 14 is rotated to the desired "feet of fall" position, that is, a setting is made for allowing the fuze to free fall prior to actuation. Rotation of pointer 14 rotates release cylinder 51 and hole 52 in release cylinder 51 moves closer to hole 49 in spindle 27. It can thus be seen that whatever distance hole 52 is moved toward hole 49, by turning pointer 14, this distance will lessen the amount of travel required of release cylinder 51 when gear 54 is rotated. Manual rotation of release cylinder 51 does not rotate gear 54 as clutch 55 permits relative rotation between gear 54 and cylinder 51. As pointer 14 is rotated, the "feet of fall" becomes less. Rotation of arm 18 which is part of pointer 14, releases venting tube 19 and fuze 11 becomes unsealed when spring 21 moves tube 19 upwardly. Venting tube 19 no longer engages actuator 28, however, actuator 28 is prevented from movement by shafts 31 which are attached to fins 32.

As the aircraft carrying fuze 11 ascends, the barometric pressure decreases, however bellows 23 remains unaffected as the pressure inside and outside the bellows is equal. Thus plunger 64 on the end of bellows 23 prevents any movement of safety barrier 61. Also, pin 65 in safety barrier 61 is engaged in relief 66 in gear 54 and prevents movement of safety barrier 61.

Upon launching fuze 11 and the store to which it is attached, the three fins 32 are opened by the dynamic pressure of the airstream. Opening of fins 32 pulls fins shafts 31 outwardly thereby releasing spring-loaded actuator 28. As best shown in FIG. 2 of the drawings, spring loaded balls 39 engage grooves 37 in fin shafts 31 and retain fin shafts 31 in a retracted position. Spring 29 moves actuator 28 toward cover 13 and a flange on actuator 28 engages resilient plug 25 and seals reservoir 24 and bellows 23. At the same time, stop arm 58 is pivoted by the movement of actuator 28 and timing mechanism 57 is unlocked and is driven by power supply 56. An output gear on timing mechanism 57 drives gear 54 which rotates release cylinder 51.

During rotation of release cylinder 51, fuze 11 is descending and the atmospheric pressure is increasing. The bellows senses this increase and bellows 23 retracts and removes plunger 24 from the path of safety barrier 61. As shown in FIG. 7 of the drawings, when pin 65 is aligned with slot 67 in gear 54, spring 63 moves safety barrier 61 so that pin 65 moves through slot 67.

Figure 4:
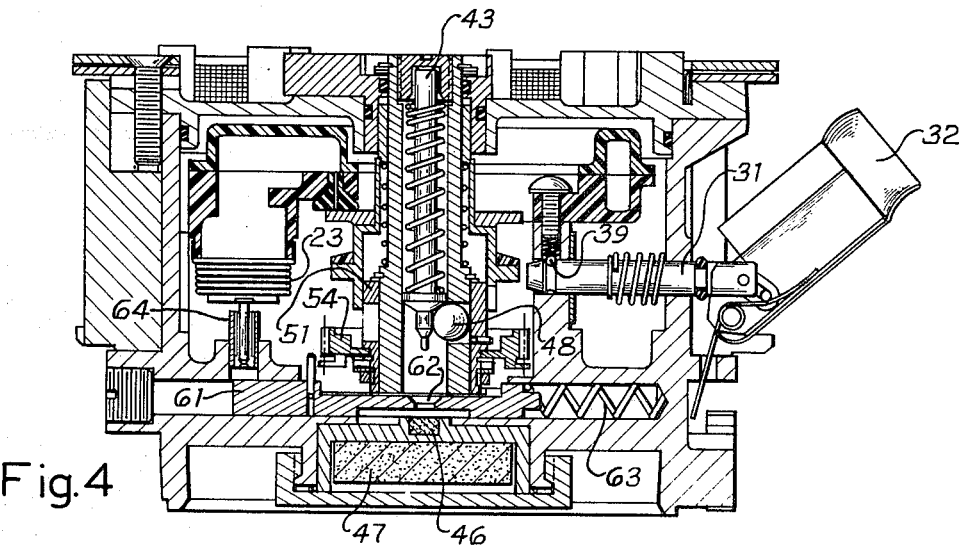
FIG. 4 is a sectional view similar to FIG. 2 of the drawing showing actuation fins in an opened condition.
Figure 5:
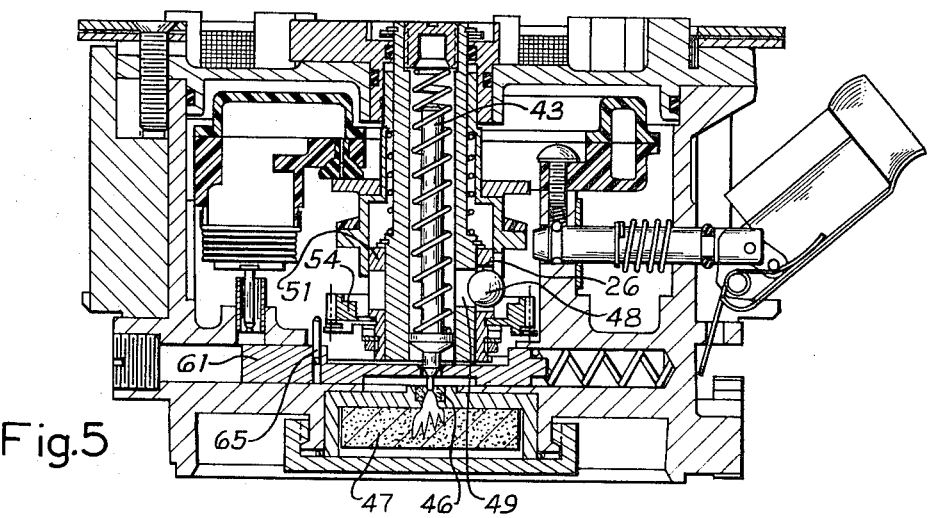
FIG. 5 is a sectional view similar to FIG. 2 of the drawing showing a firing pin striking a primer.

As shown in FIG. 4 of the drawing, aperture 62 in safety barrier 61 is now aligned with firing pin 43, and primer 46 can be detonated. When hole 52 in release cylinder 51 becomes aligned with hole 49 in spindle 27, ball 48 moves outwardly thereby releasing firing pin 43. Spring 44 then drives firing pin 43 into primer 46.

In the event that the desired pressure change does not take place, plunger 64 will block safety barrier 61, and when pin 65 becomes aligned with slot 67, pin 65 cannot move through slot 67. Gear 54 will continue to rotate until pin 65 reaches the end 71 of relief 66 and gear 54 will jam and stop rotating. Thus, release cylinder 51 will stop rotating and firing pin 43 will not be triggered.

We claim:

1. An environmental fuze comprising,
    a housing,
    a primer positioned in said housing,
    a firing pin slidably mounted in said housing for detonating said primer,
    a safety barrier slidably positioned in said housing between said firing pin and said primer, said safety barrier having a pin attached thereto,
    means for monitoring atmospheric pressure and having stop means thereon engageable with said safety barrier for preventing movement of said safety barrier until a desired change in atmospheric pressure occurs,
    a gear rotatably mounted in said housing and engageable with said pin in said safety barrier for retaining said safety barrier in a locked position,
    release means mounted in said housing for retaining said firing pin in a cocked position, and
    means for releasing said pin on said safety barrier from engagement with said gear and releasing said release means retaining said firing pin whereby said firing pin is triggered to detonate said primer.

2. An environmental fuze as set forth in claim 1 having a spring biased actuator slidably positioned in said housing for preventing rotation of said gear until said fuze is in a falling state.

3. An environmental fuze as set forth in claim 2 having an actuation fin pivotally attached to the outer periphery of said housing, and at least one shaft slidably mounted in said housing having one end attached to said actuation fin and the other end engageable with said actuator whereby said at least one shaft prevents movement of said actuator until said shaft is retracted by movement of said actuation fin.

4. An environmental fuze as set forth in claim 2 wherein said means for monitoring atmospheic pressure includes a bellows having a sealable opening therein and wherein said actuator has a flange engageable with said sealable opening.

* * * * *